United States Patent
Reinhardt et al.

(10) Patent No.: US 9,411,663 B2
(45) Date of Patent: *Aug. 9, 2016

(54) CONDITIONAL NOTIFICATION MECHANISM

(71) Applicant: Advanced Micro Devices, Inc., Sunnyvale, CA (US)

(72) Inventors: Steven K. Reinhardt, Vancouver, WA (US); Marc S. Orr, Renton, WA (US); Bradford M. Beckmann, Redmond, WA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 308 days.

This patent is subject to a terminal disclaimer.

(21) Appl. No.: 13/782,117

(22) Filed: Mar. 1, 2013

(65) Prior Publication Data

US 2014/0250312 A1 Sep. 4, 2014

(51) Int. Cl.
*G06F 9/54* (2006.01)
*G06F 1/32* (2006.01)
*G06F 12/08* (2016.01)

(52) U.S. Cl.
CPC *G06F 9/542* (2013.01); *G06F 1/32* (2013.01); *G06F 1/3206* (2013.01); *G06F 12/0811* (2013.01); *G06F 12/0824* (2013.01); *G06F 12/0897* (2013.01)

(58) Field of Classification Search
CPC ....... G06F 9/542; G06F 12/00; G06F 1/3206; G06F 1/3203; G06F 1/26
See application file for complete search history.

(56) References Cited

U.S. PATENT DOCUMENTS

| | | | | | |
|---|---|---|---|---|---|
| 4,965,718 | A | * | 10/1990 | George et al. | 718/104 |
| 2007/0113233 | A1 | * | 5/2007 | Collard et al. | 718/101 |
| 2007/0143551 | A1 | * | 6/2007 | Marr | G06F 9/30021 711/154 |
| 2008/0016374 | A1 | * | 1/2008 | Gee et al. | 713/300 |
| 2011/0161599 | A1 | * | 6/2011 | Craske | 711/141 |
| 2011/0289510 | A1 | * | 11/2011 | Lin et al. | 718/106 |

OTHER PUBLICATIONS

Michel Dubois, Murali Annavaram, Per Stenström, Parallel Computer Organization and Design, CH7-5 (Cambridge University Press, Aug. 30, 2012).*
H. Wong et al., "Pangaea: A Tightly-Coupled IA32 Heterogeneous Chip Multiprocessor," Proceedings of Parallel Architectures and Compilation Techniques (PACT) 2008.

* cited by examiner

*Primary Examiner* — Jaweed A Abbaszadeh
*Assistant Examiner* — Brian J Corcoran
(74) *Attorney, Agent, or Firm* — Park, Vaughan, Fleming & Dowler LLP (57) ABSTRACT

The described embodiments comprise a first hardware context. The first hardware context receives, from a second hardware context, an indication of a memory location and a condition to be met by the memory location. The first hardware context then sends a signal to the second hardware context when the memory location meets the condition.

25 Claims, 6 Drawing Sheets

CONDITIONAL NOTIFICATION MECHANISM

RELATED APPLICATION

The instant application is related to U.S. patent application Ser. No. 13/782,063, which is titled "Conditional Notification Mechanism," by inventors Steven K. Reinhardt, Marc S. Orr, and Bradford M. Beckmann, which was filed 1 Mar. 2013. The instant application is related to U.S. patent application Ser. No. 13/856,728, which is titled "Conditional Notification Mechanism," by inventors Steven K. Reinhardt, Marc S. Orr, and Bradford M. Beckmann, which was filed Apr. 4, 2013, and for which the attorney docket no. is 6872-120422.

BACKGROUND

1. Field

The described embodiments relate to computing devices. More specifically, the described embodiments relate to a conditional notification mechanism for computing devices.

2. Related Art

Many modern computing devices include two or more hardware contexts such as two or more separate hardware thread contexts in central processing units (CPU) or a graphics processing unit (GPU) and/or two or more CPU or GPU processor cores. In some cases, two or more hardware contexts in a computing device need communicate with one another to determine if a given event has occurred. For example, a first CPU processor core may reach a synchronization point at which the first CPU processor core communicates with a second CPU processor core to determine if the second CPU processor core has reached a corresponding synchronization point. Several techniques have been proposed to enable hardware contexts to communicate with one another to determine if a given event has occurred, as described below.

A first technique for communicating between hardware contexts is a "polling" technique in which a first hardware context, until a value in a shared memory location meets a condition, reads the shared memory location and determines if the shared memory location meets the condition. For this technique, a second (and perhaps third, fourth, etc.) hardware context updates the shared memory location when a designated event has occurred (e.g., when the second hardware context has reached a synchronization point). This technique is inefficient in terms of power consumption because the first hardware context is obligated to fetch and execute instructions for performing the reading and determining operations. Additionally, this technique is inefficient in terms of cache traffic because the reading of the shared memory location can require invalidation of a cached copy of the shared memory location. Moreover, this technique is inefficient because the polling hardware context is using computational resources that could be used for performing other computational operations.

A second technique for communicating between hardware contexts is an interrupt scheme, in which an interrupt is triggered by a first hardware context in order to communicate with a second (and perhaps third, fourth, etc.) hardware context. This technique is inefficient because processing interrupts in the computing device requires numerous operations be performed. For example, in some computing devices, it is necessary to flush instructions from one or more pipelines and save state before an interrupt handler can process the interrupt. In addition, in some computing devices, processing an interrupt requires communicating the interrupt to an operating system on the computing device for prioritization and may require invoking scheduling mechanisms (e.g., a thread scheduler, etc.).

A third technique for communicating between hardware contexts is the use of instructions such as the MONITOR and MWAIT instructions. For this technique, a first hardware context executes the MONITOR instruction to configure a cache coherency mechanism in the computing device to monitor for updates to a designated memory location. Upon then executing the MWAIT instruction, the first hardware context signals the coherency mechanism (and the computing device generally) that it is transitioning to a wait (idle) state until an update (e.g., a write) is made to the memory location. When a second hardware context updates the memory location by writing to the memory location, the coherency mechanism recognizes that the update has occurred and forwards a wake-up signal to the first hardware context, causing the first hardware context to exit the idle state. This technique is useful for simple cases where a single update is made to the memory location. However, when a value in the memory location is to meet a condition, the technique is inefficient. For example, assuming that the condition is that the memory location, which starts at a value of 0, is to be greater than 25, and that the second hardware context increases the value in the memory location by at least one each time an event occurs. In this case, the first hardware context may be obligated to execute the MONITOR/MWAIT instructions and conditional checking instructions as many as 26 times before the value in the memory location meets the condition.

A fourth technique for communicating between hardware contexts employs a user-level interrupt mechanism where a first hardware context specifies the address of a memory location ("flag"). When a second hardware context subsequently updates/sets the flag, the first hardware context is signaled to execute an interrupt handler. For this technique, much of the control for handling the communication between the hardware contexts is passed to software and thus to the programmer. Because software is used for handling the communication between the hardware contexts, technique is inefficient and error-prone.

As described above, the various techniques that have been proposed to enable hardware contexts to communicate with one another to determine if a given event has occurred are inefficient in one way or another.

SUMMARY

The described embodiments comprise a first hardware context. The first hardware context receives, from a second hardware context, an indication of a memory location and a condition to be met by the memory location. The first hardware context then sends a signal to the second hardware context when the memory location meets the condition.

In some embodiments, when receiving the condition to be met by the memory location, the first hardware context is configured to receive a test value and a conditional test to be performed to determine if a value in the memory location has a corresponding relationship to the test value. In some embodiments, the relationship to the test value comprises at least one of: "greater than;" "less than;" "equal to;" and "not equal to."

In some embodiments, when receiving the condition to be met by the memory location, the first hardware context is configured to receive a conditional test to be performed to determine if a value in the memory location changed in a given way with regard to at least one prior value in the memory location.

In some embodiments, the first hardware context changes a value in the memory location. After changing the value, the first hardware context is configured to check whether the memory location meets the condition. When the value in the memory location meets the condition, the first hardware context is configured to send the signal to the second hardware context.

In some embodiments, upon receiving the indication of the memory location and the condition to be met by the memory location, the first hardware context is configured to store the indication of the memory location and the condition to be met by the memory location in a memory element in the first hardware context associated with the second hardware context.

In some embodiments, when receiving, from the second hardware context, the indication of the memory location and the condition to be met by the memory location, the first hardware context is configured to receive, from a third hardware context, the indication of the memory location, the condition to be met by the memory location, and an indication that the signal is to be sent to the second hardware context when the memory location meets the condition, the third hardware context having received the indication of the memory location and the condition to be met by the memory location directly or indirectly from the second hardware context.

In some embodiments, the signal is a power mode transition signal that causes the second hardware context to transition from a first power mode to a second power mode. In some embodiments, the first power mode is a lower-power mode and the second power mode is a higher-power mode. In some embodiments, the first power mode is a higher-power mode and the second power mode is a lower-power mode.

In some embodiments, the first hardware context receives, from a third hardware context, an additional indication of the memory location and an additional condition to be met by the memory location. In these embodiments, the first hardware context sends an additional signal to the third hardware context when the memory location meets the additional condition.

In some embodiments, the first hardware context loads or updates a coherency state of a first copy of the memory location in the first hardware context, the loading or updating comprising forwarding an invalidation message to the second hardware context that causes the second hardware context to invalidate a second copy of the memory location held in the second hardware context. In these embodiments, the first hardware context receives, from the second hardware context, in response to the invalidation message, a response message indicating that the second copy of the memory location has been invalidated and indicating the condition to be met by the memory location.

In some embodiments, after subsequently changing a value in the first copy of the memory location in the first hardware context, the first hardware context sends the signal to the second hardware context when the value in the first copy of the memory location meets the condition.

In some embodiments, the first hardware context receives, from a third hardware context, an invalidation message that causes the first hardware context to invalidate the first copy of the memory location. The first hardware context then sends, to the third hardware context, a response message indicating that the first copy of the memory location has been invalidated, indicating the condition to be met by the memory location, and indicating that the signal is to be sent to the second hardware context when the condition is met by the memory location. In these embodiments, the third hardware context subsequently sends the signal to the second hardware context when a value in the memory location in the third hardware context meets the condition.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., some or all of computing device 100 (see FIG. 1), directory 132, one or more hardware contexts 200 (see FIG. 2), etc. and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more interrelated circuits that perform the described operations. In some embodiments, the circuits in a functional block include circuits that execute program code (e.g., machine code, firmware, etc.) to perform the described operations.

Overview

The described embodiments include a computing device with at least one hardware context that includes mechanisms (notification mechanisms) for communicating to one or more other hardware contexts when a memory location meets a condition. In these embodiments, a hardware context may include any portion of a set of circuits and mechanisms in the computing device such as a central processing unit (CPU) or graphics processing unit (GPU) core, a hardware thread context on a CPU or GPU core, etc.

In some embodiments, to enable communication/notification when the memory location meets the condition, a second hardware context (the hardware context that is to receive the notification when the memory location meets the condition) sends a message to a first hardware context that includes an indication of the memory location and an indication of the condition that is to be met by the memory location. The first hardware context then monitors the memory location (e.g., a copy of the memory location stored in a cache associated with the second hardware context) and determines when the memory location meets the condition. In these embodiments, the first hardware context (or another hardware context) can change the value in the memory location, and can determine if the memory location meets the condition after changing the value in the memory location. For example, the first hardware context can increment or otherwise update a value and then determine if the updated value meets the condition. When the memory location meets the condition, the first hardware context communicates a signal to the second hardware context to notify the second hardware context that the memory location meets the condition. Based on the signal received from the first hardware context, the second hardware context may perform one or more operations.

In some embodiments, the condition to be met by the memory location in the message sent from the second hardware context to the first hardware context comprises: (1) a test value and (2) a conditional test to be performed to determine if a value in the memory location has a corresponding relationship to the test value (e.g., greater than, equal to, not equal to, less than, etc.). As an example, the message may include a test value of 28 and an indication that a conditional test should be performed to determine if the memory location holds a value that is greater than or equal to the test value.

In some embodiments, the condition to be met by the memory location in the message sent from the second hardware context to the first hardware context comprises: (1) a test to determine if the value in the memory location changed in a given way with regard to at least one prior value in the memory location. As an example, the conditional test can include a test to determine if the value has increased, decreased, reached a certain proportion of the at least one prior value, etc.

In some embodiments, the first hardware context (i.e., the hardware context that monitors the memory location) comprises a mechanism configured to keep a record of the condition that is to be met by the memory location that is associated with the second hardware context (i.e., the hardware context that is to receive the notification when the memory location meets the condition). In some embodiments, the record comprises the test value and the conditional test to be performed on the value in the memory location, and may also comprise other information such as a record of the at least one prior value of the memory location (as described above). In some of these embodiments, the mechanism in the first hardware context includes a separate record for each other hardware context in computing device (that can be used for monitoring a memory location for each other hardware context).

In some embodiments, the first hardware context (i.e., the hardware context that monitors the memory location) may receive the message that includes the indication of the memory location and the indication of the condition that is to be met by the memory location on behalf of the second hardware context from a third hardware context. In these embodiments, the third hardware context can have directly or indirectly (via one or more other hardware contexts) received the message from the second hardware context. For example, the second hardware context may have sent the message to the third hardware context originally, but the third hardware context can, under certain conditions, forward the message to the first hardware context, which is then responsible for monitoring the memory location.

In some embodiments, one or more additional hardware contexts (e.g., a third, a fourth, etc. hardware context) may send corresponding messages to the first hardware context that each include an indication of a memory location and an indication of a condition that is to be met by the memory location. In these embodiments, the first hardware context monitors each of the memory locations to determine when each of the memory locations meets the corresponding condition. In some of these embodiments, the monitored memory location is the same for two or more different hardware contexts and the condition may (or may not) be the same. In other words, the first hardware contexts can monitor a same memory location for two or more different conditions for two or more other hardware contexts.

In some embodiments, after sending the message to the first hardware context, the second hardware context transitions from a first power mode to a second power mode. For example, the second hardware context can transition from an active mode to an idle mode. As another example, the second hardware context can transition from a higher-power mode (e.g., full operating power) to a lower-power mode (e.g., a sleep or powered-down). In these embodiments, the signal communicated from the first hardware context to the second hardware context can be a power mode transition signal such as a "wake" signal or a "sleep" signal.

The described embodiments provide improved performance (in comparison to existing systems) because the first hardware context (i.e., the hardware context that monitors the memory location) performs the check(s) of the memory location to determine if the memory location meets the condition on behalf of the second hardware context (i.e., the hardware context that is to receive the notification when the memory location meets the condition). Thus, in some embodiments, the second hardware context can perform other operations and/or can be placed in a lower-power operating mode (e.g., a powered-off or idle mode), and can await the signal from the first hardware context when the memory location meets the condition.

Computing Device

Figure 1:
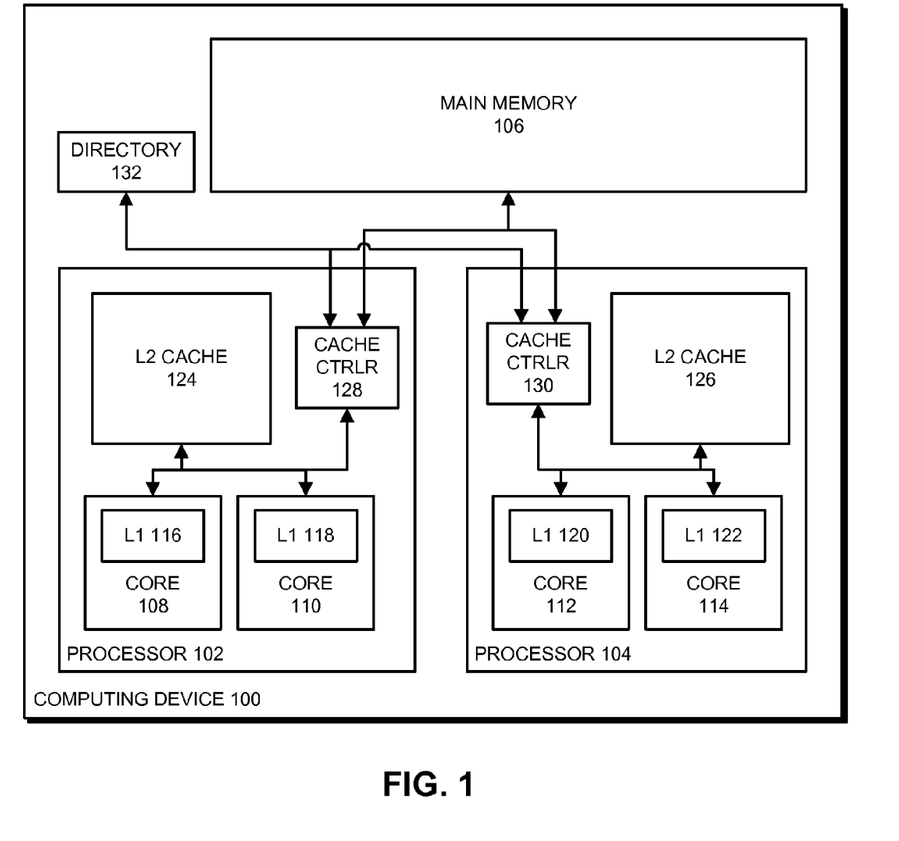
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes processors 102-104 and main memory 106. Processors 102-104 are generally devices that perform computational operations in computing device 100. Processors 102-104 include four processor cores 108-114, each of which includes a computational mechanism such as a central processing unit (CPU), a graphics processing unit (GPU), and/or an embedded processor.

Processors 102-104 also include cache memories (or "caches") that can be used for storing instructions and data that are used by processor cores 108-114 for performing computational operations. The caches in processors 102-104 include a level-one (L1) cache 116-122 (e.g., "L1 116") in each processor core 108-114 that is used for storing instructions and data for use by the corresponding processor core. Generally, L1 caches 116-122 are the smallest of a set of caches in computing device 100 and are located closest to the circuits (e.g., execution units, instruction fetch units, etc.) in the respective processor cores 108-114. The closeness of the L1 caches 116-122 to the corresponding circuits enables the fastest access to the instructions and data stored in the L1 caches 116-122 from among the caches in computing device 100.

Processors 102-104 also include level-two (L2) caches 124-126 that are shared by processor cores 108-110 and 112-114, respectively, and hence are used for storing instructions and data for all of the sharing processor cores. Generally, L2 caches 124-126 are larger than L1 caches 116-122 and are located outside, but close to, processor cores 108-114 on the same semiconductor die as processor cores 108-114. Because L2 caches 124-126 are located outside the corresponding processor cores 108-114, but on the same die, access to the instructions and data stored in L2 cache 124-126 is slower than accesses to the L1 caches.

Each of the L1 caches 116-122 and L2 caches 124-126, (collectively, "the caches") include memory circuits that are used for storing cached data and instructions. For example, the caches can include one or more of static random access memory (SRAM), embedded dynamic random access memory (eDRAM), DRAM, double data rate synchronous DRAM (DDR SDRAM), and/or other types of memory circuits.

Main memory 106 comprises memory circuits that form a "main memory" of computing device 100. Main memory 106 is used for storing instructions and data for use by the processor cores 108-114 on processor 102-104. In some embodiments, main memory 106 is larger than the caches in computing device 100 and is fabricated from memory circuits such as one or more of DRAM, SRAM, DDR SDRAM, and/or other types of memory circuits.

Taken together, L1 caches 116-122, L2 caches 124-126, and main memory 106 form a "memory hierarchy" for computing device 100. Each of the caches and main memory 106 are regarded as levels of the memory hierarchy, with the lower levels including the larger caches and main memory 106. Within computing device 100, memory requests are preferentially handled in the level of the memory hierarchy that results in the fastest and/or most efficient operation of computing device 100.

In addition to processors 102-104 and memory 106, computing device 100 includes directory 132. In some embodiments, processor cores 108-114 may operate on the same data (e.g., may load and locally modify data from the same locations in memory 106). Computing device 100 generally uses directory 132 to avoid different caches (and memory 106) holding copies of data in different states—to keep data in computing device 100 "coherent." Directory 132 is a functional block that includes mechanisms for keeping track of cache blocks/data that are held in the caches, along with the coherency state in which the cache blocks are held in the caches (e.g., using the MOESI coherency states modified, owned, exclusive, shared, invalid, and/or other coherency states). In some embodiments, as cache blocks are loaded from main memory 106 into one of the caches in computing device 100 and/or as a coherency state of the cache block is changed in a given cache, directory 132 updates a corresponding record to indicate that the data is held by the holding cache, the coherency state in which the cache block is held by the cache, and/or possibly other information about the cache block (e.g., number of sharers, timestamps, etc.). When a processor core or cache subsequently wishes to retrieve data or change the coherency state of a cache block held in a cache, the processor core or cache checks with directory 132 to determine if the data should be loaded from main memory 106 or another cache and/or if the coherency state of a cache block can be changed.

In addition to operations related to maintaining data in a coherent state, in some embodiments, directory 132 performs operations for enabling communications between entities in computing device 100 when a memory location meets a condition. For example, in some embodiments, directory 132 generates and/or forwards messages from entities requesting to load cache blocks to other entities. In addition, in some embodiments, directory 132 performs operations for monitoring the memory location to determine when the memory location meets a condition. These operations are described in more detail below.

As can be seen in FIG. 1, processors 102-104 include cache controllers 128-130 ("cache ctrlr"), respectively. Each cache controller 128-130 is a functional block with mechanisms for handling accesses to main memory 106 and communications with directory 132 from the corresponding processor 102-104.

Although an embodiment is described with a particular arrangement of processors and processor cores, some embodiments include a different number and/or arrangement of processors and/or processor cores. For example, some embodiments have only one processor core (in which case the caches are used by the single processor core), while other embodiments have two, six, eight, or another number of processor cores—with the cache hierarchy adjusted accordingly. Generally, the described embodiments can use any arrangement of processors and/or processor cores that can perform the operations herein described.

Additionally, although an embodiment is described with a particular arrangement of caches, some embodiments include a different number and/or arrangement of caches. For example, the caches (e.g., L1 caches 116-122, etc.) can be divided into separate instruction and data caches. Additionally, L2 cache 124 may not be shared in the same way as shown, and hence may only be used by a single processor core, two processor cores, etc. (and hence there may be multiple L2 caches 124 in each processor 102-104). As another example, some embodiments include different levels of caches, from only one level of cache to multiple levels of caches, and these caches can be located in processors 102-104 and/or external to processor 102-104. For example, some embodiments include one or more L3 caches (not shown) in the processors or outside the processors that is used for storing data and instructions for the processors. Generally, the described embodiments can use any arrangement of caches that can perform the operations herein described.

Additionally, although computing device is described using cache controllers 128-130 and directory 132, in some embodiments, one or more of these elements is not used. For example, in some embodiments, one or more of the caches includes mechanisms for performing the operations herein described. In addition, cache controllers 128-130 and/or directory 132 may be located elsewhere in computing device.

Moreover, although computing device 100 and processors 102-104 are simplified for illustrative purposes, in some embodiments, computing device 100 and/or processors 102-104 include additional mechanisms for performing the operations herein described and other operations. For example, computing device 100 and/or processors 102-104 can include power controllers, mass-storage devices such as disk drives or large semiconductor memories (as part of the memory hierarchy), batteries, media processors, input-output mechanisms, communication mechanisms, networking mechanisms, display mechanisms, etc.

Hardware Context and Condition Table

In this description, hardware contexts are used to describe entities that communicate a memory location and a condition that the memory location is to meet, that monitor a memory location to determine when the memory location meets a condition, and/or communicate when the memory location meets the condition. Generally, a hardware context can include any portion of computing device 100 that may be configured to monitor memory locations and/or communicate as described. For example, an entity may include one or more CPU or GPU cores, one or more hardware thread contexts in a CPU or GPU core, one or more functional blocks, etc.

Figure 2:
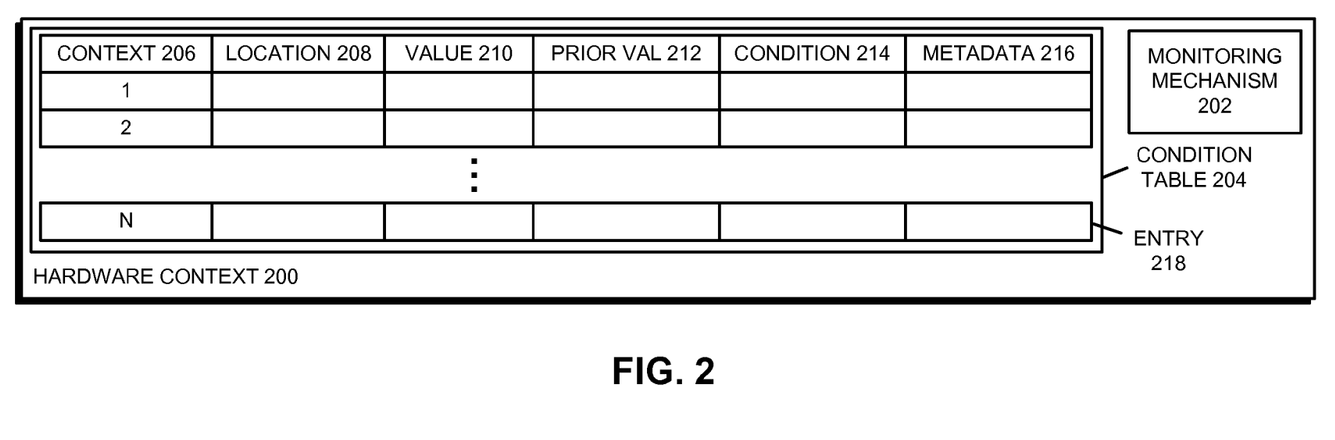
FIG. 2 presents a block diagram illustrating a hardware context in accordance with some embodiments.

In some embodiments, each hardware context that can be configured to monitor a memory location to determine when the memory location meets a condition includes a mechanism for recording the memory location and the condition. FIG. 2 presents a block diagram illustrating a hardware context 200 in accordance with some embodiments. As can be seen in FIG. 2, hardware context 200 includes monitoring mechanism 202 and condition table 204. Monitoring mechanism 202 is a functional block that is configured for performing operations for maintaining condition table 204, for monitoring memory locations, for using the information in condition table 204 to determine if a memory location meets a condition, etc.

Condition table 204 is stored in memory elements (registers, memory circuits, etc.) in hardware context 200. Condition table 204 includes N entries (an example entry is labeled as entry 218), each of which holds information about a memory location to be monitored to determine when a condition is met by the memory location. In some embodiments, condition table 204 includes an entry for each other hardware context in computing device 100 that may request that hardware context 200 monitor a memory location. For example, if the hardware contexts are processor cores 108-114, condition table 204 may comprise three entries (not four, as hardware context 200 itself is one of the processor cores). More generally, hardware context 200 comprises sufficient entries in condition table 204 to enable uniquely recording a memory location and a condition to be met by the memory location for at least one other hardware context in computing device 100.

In some embodiments, each entry in condition table 204 comprises fields for context 206, location 208, value 210, condition 212, prior value ("prior val") 214, and metadata 216. The context 206 field holds an indication of the hardware context associated with the entry in condition table 204. For example, the context 206 field may include a number assigned to each hardware context (as shown) by monitoring mechanism 202, a system-assigned identifier for the hardware context, etc. When a message is received by hardware context 200 indicating a memory location and a condition that is to be met by the memory location from another hardware context, monitoring mechanism 202 uses the context 206 field to determine the entry in condition table 204 in which the information is to be stored. If/when monitoring mechanism 202 subsequently determines that the memory location meets one or more conditions, monitoring mechanism 202 uses the context field to determine the other hardware context(s) to which the signal (that the memory location has met the one or more conditions) is to be communicated.

The location 208 field in each entry holds an indication of a memory location that is being monitored by hardware context 200 for the corresponding hardware context. Upon making a change to a memory location, monitoring mechanism 202 checks one or more entries in condition table 204 to determine if a location 208 field in an entry in condition table 204 indicates that the changed memory location is to be monitored. If so, monitoring mechanism 202 determines if the memory location meets the condition. Note that, in some embodiments, a "memory location" may comprise any addressable portion of the memory from individual bytes (if bytes are addressable) to memory locations indicated by individual addresses to blocks of memory that include multiple separate addresses.

The value 210 field in each entry holds an indication of a value that is used to determine when the memory location meets the condition. Generally, the value field can hold any value that can be used in a conditional, mathematical, bitwise, etc. operation by monitoring mechanism 202. For example, the value 210 field can hold numerical values (−1.2, 0, 14, etc.), character values (A, etc.), and/or other combinations of bits.

The prior value 212 field in each entry holds a prior value for the memory location that is being monitored. Generally, the prior value recorded in the prior value 212 field can be any value from the memory location that may be used to determine if a present value in the memory location changed in a given way (increased, decreased, doubled, halved, etc.) with regard to the prior value. The prior value can be read from the memory location and recorded into the prior value 212 at any appropriate time. For example, the prior value can be recorded at the time that the message is received by hardware context 200 indicating a memory location and a condition that is to be met by the memory location from another hardware context (i.e., as an initial value for the memory location). As another example, the prior value can be recorded after updating the memory location one or more times.

The condition 212 field in each entry holds an indication of the condition that is to be met by the memory location. In some embodiments, the condition comprises a value such as a binary bit pattern, a number, etc. that represents a conditional, mathematical, bitwise, etc. test that is to be performed using value 210 or prior value 212. For example, in some embodiments, a binary value of 01 in the condition 212 field indicates that a "less than" condition is to be used, so that the memory location meets the condition when a value in the memory location is less than a value in the value 210 field (or the prior value 212 field). As another example, in some embodiments, a binary value of 0110 in the condition 212 field indicates that a "half" condition is to be used, so that the memory location meets the condition when a value in the memory location is equal to or less than half a value in the value 210 field (or the prior value 212 field). In some embodiments, monitoring mechanism 202 includes logic, a table, etc. for determining the conditional test to apply based on the value in the condition 214 field.

The metadata 216 field in each entry holds metadata for the entry. For example, metadata 216 can hold one or more flags such as a valid flag, etc.

As briefly described above, upon hardware context 200 receiving a message from another hardware context that includes an indication of the memory location and an indication of the condition that is to be met by the memory location, monitoring mechanism 202 records the memory location in the location 208 field in an entry associated with the other hardware context. Depending on the type of condition, monitoring mechanism 202 also records the condition in one or more of the value 210, prior value 212, and condition 214 fields in the entry. For example, if the message from the other hardware context includes a value (e.g., 30) and a condition (e.g., a binary value of 110, which in some embodiments represents a "greater than or equal" test), monitoring mechanism 202 records the value in the value 210 field and the condition in the condition 214 field.

Upon subsequently modifying a memory location, monitoring mechanism 202 checks one or more entries (e.g., each valid entry) in condition table to determine if the location 208 field in the one or more entries lists the memory location. When a location 208 field in an entry lists the memory location, monitoring mechanism 202 uses values from one or more of the value 210, prior value 212, and condition 214 fields to determine if the memory location meets the condition. For example, if the condition 214 field holds a value of 14, which in some embodiments represents "greater than," and the prior value 212 field holds a value of 200, monitoring mechanism 202 determines if the value in the memory location is greater than 200. As another example, if the condition 214 field holds a value of 3, which in some embodiments represents "non-zero," monitoring mechanism 202 determines if the value in the memory location is non-zero (note that, for this check, neither a value from the value 210 or prior value 212 fields is used). When the memory location meets the condition, monitoring mechanism 202 sends a signal to the hardware context indicated in the context 206 field for the entry.

Although various fields are shown in condition table 204, in some embodiments, one or more of the fields is/are not present in condition table 204. For example, in some embodiments the prior value 214, value 210, and/or condition 212 fields is/are not present (e.g., depending on the information needed to determine if the memory location meets the condition). Generally, condition table 204 comprises sufficient fields to enable performing the operations herein described.

In addition, although described as a "table," condition table 204 need not be a table, but may simply comprise one or more memory elements that store some or all of the information herein described.

Lower-Power and Higher-Power Operating Modes

As described herein, hardware contexts in some embodiments may transition from a first power mode to a second power mode. For example, in some embodiments the hardware contexts can transition from a higher-power mode to a lower-power mode, or vice versa.

In some embodiments, the lower-power mode comprises any operating mode in which less electrical power and/or computational power is consumed by the hardware context than in the higher-power mode. For example, the lower-power mode may be an idle mode, in which some or all of a set of processing circuits in the hardware context (e.g., a processor core, a hardware thread context on a processor core, etc.) are halted or operating at a reduced rate. As another example, the lower-power mode may be a sleep or powered-down mode where an operating voltage for some or all of the hardware context is reduced and/or control signals (e.g., clocks, strobes, precharge signals, etc.) for some or all of the hardware context are slowed or stopped. Note that, in some embodiments, at least a portion of the hardware context continues to operate in the lower-power mode. For example, in some embodiments, the hardware context remains sufficiently operable to send and receive messages for communicating between hardware contexts as described herein (see, e.g., FIGS. 3-5).

In some embodiments, the higher-power mode comprises any operating mode in which more electrical power and/or computational power is consumed by the hardware context than in the lower-power mode. For example, the higher-power mode may be an active mode, in which some or all of a set of processing circuits in the hardware context are operating at a typical/normal rate. As another example, the higher-power mode may be an awake/normal mode in which an operating voltage for some or all of the hardware context is set to a typical/normal voltage and/or control signals (e.g., clocks, strobes, precharge signals, etc.) for some or all of the hardware context are operating at typical/normal rates.

Communication Between Hardware Contexts

Figure 3:
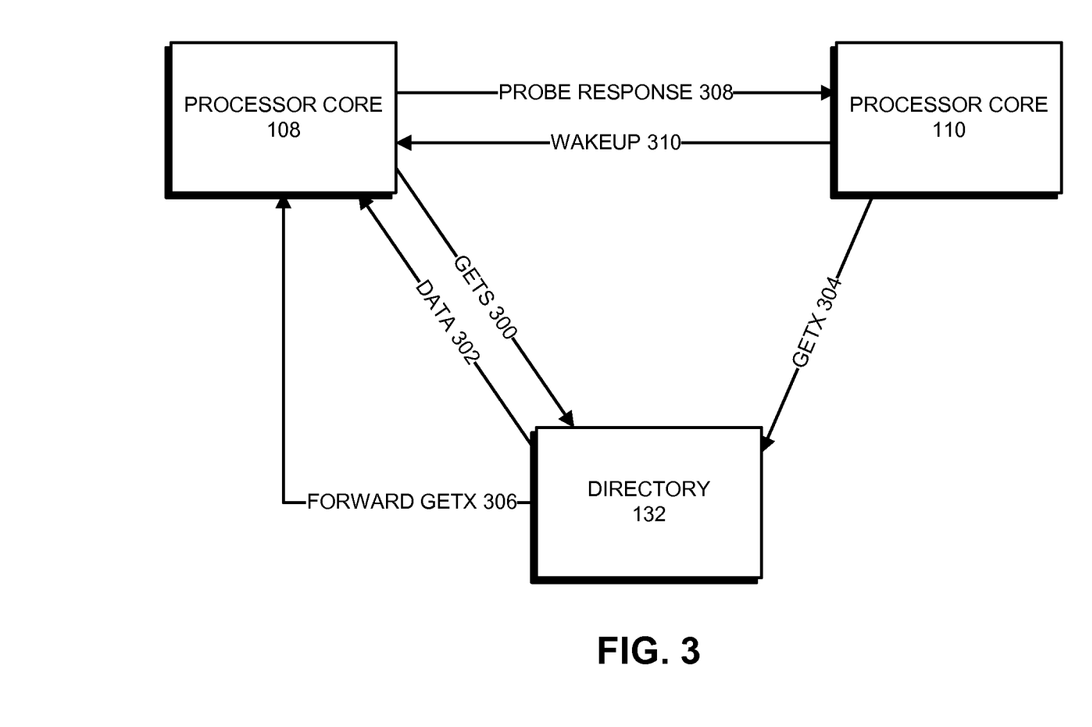
FIG. 3 presents a diagram illustrating communications between two hardware contexts in accordance with some embodiments.

FIG. 3 presents a diagram illustrating communications between two hardware contexts in accordance with some embodiments. For the example in FIG. 3, the hardware contexts are processor cores 108 and 110, and a cache block that includes a copy of the memory location that is to be monitored is stored in a local cache in the processor cores (e.g., L1 caches 116 and 118). Note that the operations and communications/messages shown in and described for FIG. 3 are presented as a general example of operations and communications/messages used in some embodiments. The operations performed by other embodiments include different operations and/or operations that are performed in a different order and the communications/messages may be different. Additionally, although certain mechanisms in computing device 100 are used in describing the process, in some embodiments, other mechanisms can perform the operations.

The process shown in FIG. 3 starts when processor core 108 prepares to enter a lower-power mode. As part of the preparation, processor core 108 sends GETS 300 to load a memory location that is to be monitored to a cache block (e.g., a cache line or another portion of the cache) in L1 cache 116 in a shared coherency state. Upon receiving GETS 300, directory 132 performs operations (e.g., invalidations, coherency updates, etc.) to get shared permission for the memory location and then sends data 302 from the memory location to processor core 108 to be stored in L1 cache 116 in the shared coherency state. After storing the data to the cache block in L1 cache 116, processor core 108 enters the lower-power mode (the lower-power mode is described above).

Next, processor core 110 sends GETX 304 to directory 132 to load the memory location to a cache block in L1 cache 118 in an exclusive coherency state. Because processor core 108 holds the copy of the memory location in the shared state, directory 132 forwards GETX 304 to processor core 108 as forward GETX 306 (which indicates the memory location and that GETX 304 came from processor core 110). Upon receiving forward GETX 306, processor core 108 sends probe response 308 to processor core 110 (and may also send an acknowledge signal to directory 132). Probe response 308 includes the data requested by processor core 110, along with an indication of the condition that is to be met by the memory location. For example, in some embodiments, probe response 308 may include a test value (e.g., 64) and a conditional test to be performed to determine if a value in the memory location has a corresponding relationship to the test value (e.g., greater than, equal to, not equal to, less than, etc.). As another example, in some embodiments, probe response 308 may include a test to determine if the value in the memory location changed in a given way with regard to at least one prior value in the memory location.

Upon receiving probe response, processor core 110 stores the data to a cache block in L1 cache 118 for the memory location in the exclusive coherency state. Processor core 110 also stores an identifier of the memory location (and/or the cache block) and the condition to be met by the memory location to enable subsequent determination of whether the memory location meets the condition. For example, processor core 110 can store the identifier of the memory location and the condition to be met by the memory location in the appropriate fields in an entry associated with processor 108 in condition table 204 in processor core 110.

Next, processor core 110 modifies the value of the cache block. Based on the modification of the value in the cache block, processor core 110 reads the stored identifier for the memory location and determines that the cache block is to be monitored to determine if the associated memory location meets the condition. Processor core 110 then uses the stored condition to determine whether the memory location meets the condition. For example, when the test value is 13 and the condition is "greater than or equal," processor core 110 can perform one or more operations to determine if the value in the memory location is greater than or equal to 13. If the memory location does not meet the condition, processor core 110 performs subsequent operations without sending wakeup 310 to processor core 108. Otherwise, when the memory location meets the condition, processor core 110 sends wakeup 310 to processor core 108. Receiving wakeup 310 causes processor core 108 to "wake up," or transition from the lower-power mode to a higher-power mode.

As described above, in some embodiments, processor core 110 performs the check to determine if the condition is met by the memory location before sending wakeup 310 to processor core 108 and doesn't send wakeup 310 to processor core 108 unless/until the memory location meets the condition. This differs from existing systems, in which processor core 110 simply wakes processor core 108 up to check the condition each time a change is made to the cache block/memory location by processor core 110. When compared to existing systems, by performing the check in processor core 110 in this way, these embodiments can limit the amount of coherency traffic because the cache block/data is not passed between processor cores 108 and 110 to enable the check to be performed in processor core 108 and to enable processor core 110 to update the cache block (particularly where processor core 110 makes multiple updates to the cache block). In addition, because processor core 110 performs the check to determine if the memory location meets the condition, processor core 108 need not transition to the higher-power mode to perform the check and may therefore remain in the lower-power mode for longer periods of time.

In the above-described embodiments, one or more of the messages communicated between processor core 108 and processor core 110 include information that is not included in messages in existing systems. For example, along with the data, probe response 308 includes the condition to be met by the memory location. Including this information in the messages enables processor core 110 to check the memory location (i.e., the copy of the memory location in the exclusive state in L1 cache 118) to determine if the memory location meets the condition.

Figure 4:
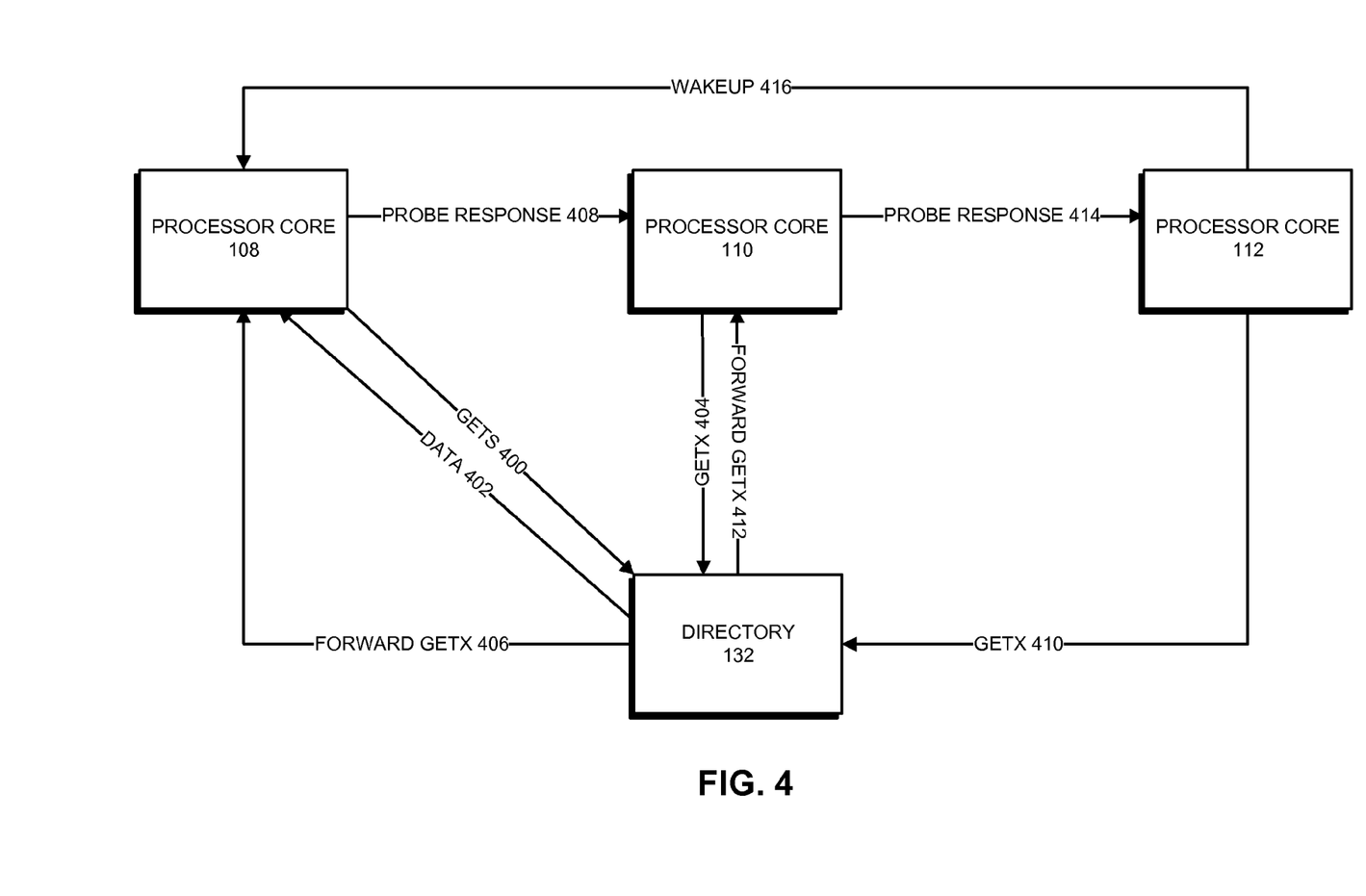
FIG. 4 presents a diagram illustrating communications between three hardware contexts in accordance with some embodiments.

FIG. 4 presents a diagram illustrating communications between three hardware contexts in accordance with some embodiments. For the example in FIG. 4, the hardware contexts are processor cores 108, 110, and 112, and a cache block that includes a copy of the memory location that is to be monitored is stored in a local cache in the processor cores (e.g., L1 caches 116, 118, and 120). Note that the operations and communications/messages shown in and described for FIG. 4 are presented as a general example of operations and communications/messages used in some embodiments. The operations performed by other embodiments include different operations and/or operations that are performed in a different order and the communications/messages may be different. Additionally, although certain mechanisms in computing device 100 are used in describing the process, in some embodiments, other mechanisms can perform the operations.

The process shown in FIG. 4 differs from the process shown in FIG. 3 in that processor core 112 (a third hardware context) issues a GETX for a monitored memory location after processor core 110 (the second hardware context) received the data for a memory location to be monitored and the condition from processor core 108 (the first hardware context). Because directory 132 causes processor core 110 to send the data to processor core 112 and invalidate the copy of the memory location in L1 cache 118 as part of granting exclusive permission to processor core 112, processor core 110 can no longer monitor the memory location. Processor core 110 therefore also forwards the condition to processor core 112 to so that processor core 112 can monitor the memory location. In this way, processor core 112 indirectly receives the condition originally sent from processor core 108 and monitors the memory location for processor core 108 as described below.

The process shown in FIG. 4 starts when processor core 108 prepares to enter a lower-power mode. As part of the preparation, processor core 108 sends GETS 400 to load a memory location that is to be monitored to a cache block in L1 cache 116 in a shared coherency state. Upon receiving GETS 400, directory 132 performs operations (e.g., invalidations, coherency updates, etc.) to get shared permission for the memory location and then sends data 402 from the memory location to processor core 108 to be stored in L1 cache 116 in the shared coherency state. After storing the data to the cache block in L1 cache 116, processor core 108 enters the lower-power mode.

Next, processor core 110 sends GETX 404 to directory 132 to load the memory location to a cache block in L1 cache 118 in an exclusive coherency state. Because processor core 108 holds the copy of the memory location in the shared state, directory 132 forwards GETX 404 to processor core 108 as forward GETX 406 (which indicates the memory location and that GETX 404 came from processor core 110). Upon receiving forward GETX 406, processor core 108 sends probe response 408 to processor core 110 (and may also send an acknowledge signal to directory 132). Probe response 408 includes the data requested by processor core 110, along with an indication of the condition that is to be met by the memory location. For example, in some embodiments, probe response 408 may include a test value (e.g., 64) and a conditional test to be performed to determine if a value in the memory location has a corresponding relationship to the test value (e.g., greater than, equal to, not equal to, less than, etc.). As another example, in some embodiments, probe response 408 may include a test to determine if the value in the memory location changed in a given way with regard to at least one prior value in the memory location.

Upon receiving probe response 408, processor core 110 stores the data to a cache block in L1 cache 118 for the memory location in the exclusive coherency state. Processor core 110 also stores an identifier of the memory location (and/or the cache block) and the condition to be met by the memory location to enable subsequent determination of whether the memory location meets the condition. For example, processor core 110 can store the identifier of the memory location and the condition to be met by the memory location in the appropriate fields in an entry associated with processor 108 in condition table 204 in processor core 110.

Processor core 110 may (or may not) then modify the value of the cache block. In the event that processor core 110 modifies the value of the cache block, based on the modification of the value in the cache block, processor core 110 reads the stored identifier for the memory location and determines that the cache block is to be monitored to determine if the associated memory location meets the condition. Processor core 110 then uses the stored condition to determine whether the memory location meets the condition. For example, when the test value is 13 and the condition is "greater than or equal," processor core 110 can perform one or more operations to determine if the value in the memory location is greater than or equal to 13. For this example, it is assumed that the value in the memory location does not meet the condition and hence processor core 110 does not send a wakeup signal to processor core 108.

Next, processor core 112 sends GETX 410 to directory 132 to load the memory location to a cache block in L1 cache 120 in an exclusive coherency state. Because processor core 110 holds the copy of the memory location in the exclusive state, directory 132 forwards GETX 410 to processor core 110 as forward GETX 412 (which indicates the memory location and that GETX 410 came from processor core 112). Upon receiving forward GETX 412, processor core 110 sends probe response 414 to processor core 112 (and may also send an acknowledge signal to directory 132). Probe response 414 includes the data requested by processor core 112, along with an indication of the condition that is to be met by the memory location and that processor core 108 is to be notified when the memory location meets the condition. Note that, by performing this operation, processor core 110 is forwarding the condition originally received from processor core 108 in probe response 408. Forwarding the condition enables processor core 112 to monitor the memory location.

Upon receiving probe response 414, processor core 112 stores the data to a cache block in L1 cache 120 for the memory location in the exclusive coherency state. Processor core 112 also stores an identifier of the memory location (and/or the cache block) and the condition to be met by the memory location to enable subsequent determination of whether the memory location meets the condition. For example, processor core 112 can store the identifier of the memory location and the condition to be met by the memory location in the appropriate fields in an entry associated with processor 108 in condition table 204 in processor core 112.

Next, when processor core 112 modifies the value of the cache block, processor core 112 reads the stored identifier for the memory location and determines that the cache block is to be monitored to determine if the associated memory location meets the condition. Processor core 112 then uses the stored condition to determine whether the memory location meets the condition. If the memory location does not meet the condition, processor core 112 performs subsequent operations without sending wakeup 416 to processor core 108. Otherwise, when the memory location meets the condition, processor core 112 sends wakeup 416 to processor core 108. Receiving wakeup 416 causes processor core 108 to "wake up," or transition from the lower-power mode to a higher-power mode.

As described above, in some embodiments, processor core 112 performs the check to determine if the condition is met by the memory location before sending wakeup 416 to processor core 108 and doesn't send wakeup 416 to processor core 108 unless the memory location meets the condition. This differs from existing systems, in which processor core 112 simply wakes processor core 108 up to check the condition each time a change is made to the cache block/memory location by processor core 112. When compared to existing systems, by performing the check in processor core 112 in this way, these embodiments can limit the amount of coherency traffic because the cache block/data is not passed between processor cores 108 and 112 to enable the check to be performed in processor core 108 and to enable processor core 112 to update the cache block (particularly where processor core 112 makes multiple updates to the cache block). In addition, processor core 108 need not transition to the higher-power mode to perform the check and may therefore remain in the lower-power mode for longer periods of time.

In addition, in the above-described embodiments, the condition is passed with the data (in probe response 414) when the cache block that contains the copy of the data from the memory location is invalidated in L1 cache 118. In this way, the condition continues to be monitored in processor core 112 (the third hardware context in this example). Note that this forwarding of the condition from processor core 108 may occur any number of times and hence two or more processor cores may forward the condition to each other (including back and forth).

In the above-described embodiments, one or more of the messages communicated between processor cores 108, 110, and 112 include information that is not included in messages in existing systems. For example, along with the data, probe responses 408 and 414 include the condition to be met by the memory location. Including this information in the messages enables processor core 112 (and processor core 110) to check the memory location (the copy of the memory location in the exclusive state in L1 caches 118 and 120) to determine if the memory location meets the condition.

Figure 5:
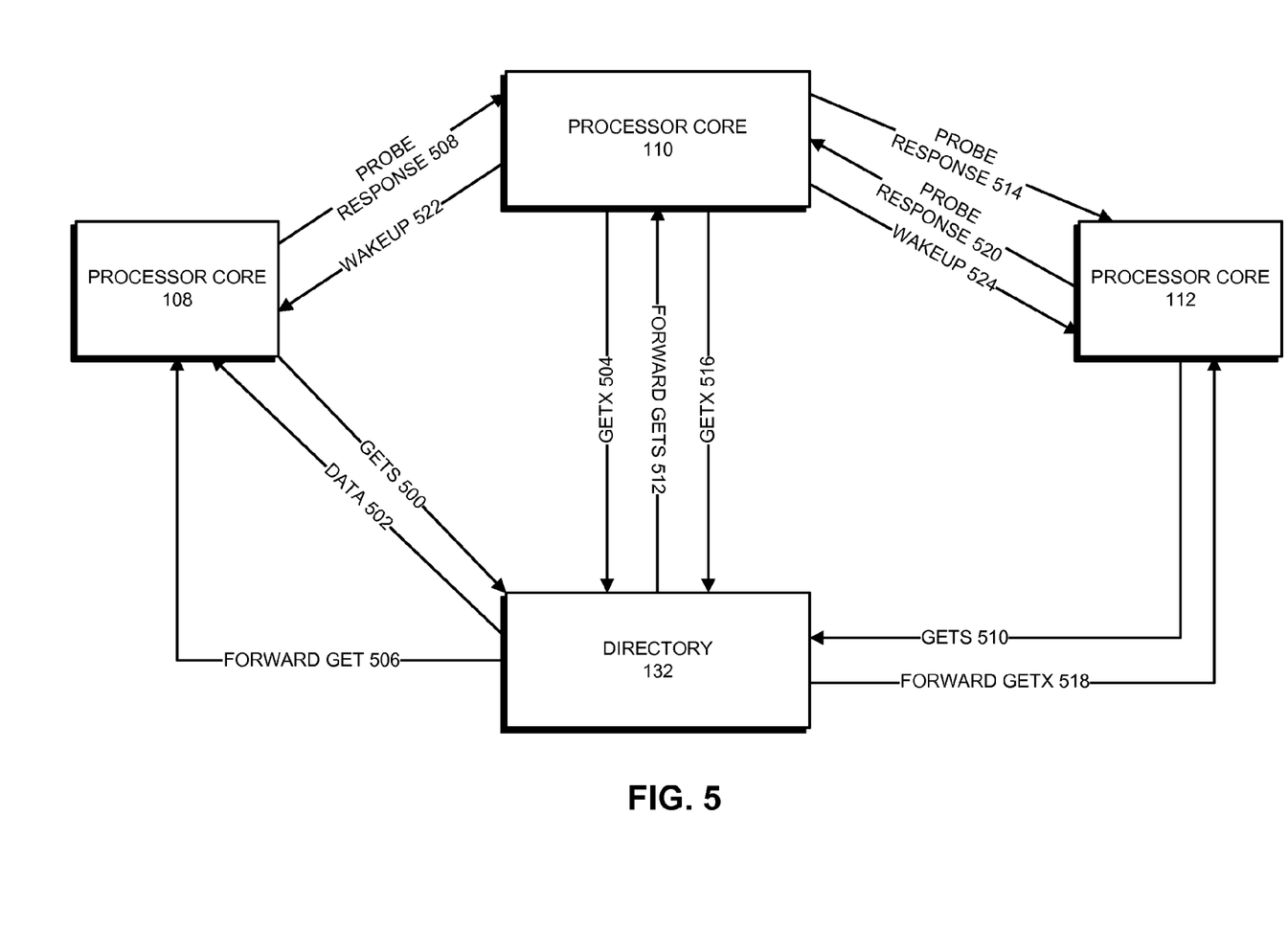
FIG. 5 presents a diagram illustrating communication between three hardware contexts in accordance with some embodiments.

FIG. 5 presents a diagram illustrating communication between three hardware contexts in accordance with some embodiments. For the example in FIG. 5, the hardware contexts are processor cores 108, 110, and 112, and a cache block that includes a copy of the memory location that is to be monitored is stored in a local cache in the processor cores (e.g., L1 caches 116, 118, and 120). Note that the operations and communications/messages shown in and described for FIG. 5 are presented as a general example of operations and communications/messages used in some embodiments. The operations performed by other embodiments include different operations and/or operations that are performed in a different order and the communications/messages may be different. Additionally, although certain mechanisms in computing device 100 are used in describing the process, in some embodiments, other mechanisms can perform the operations.

The process shown in FIG. 5 differs from the process shown in FIG. 3 in that processor core 112 (a third hardware context) is an additional hardware context (in addition to the first hardware context, processor core 108) on whose behalf the memory location is to be monitored by processor core 110 (the second hardware context). In this example, therefore, processor core 110 monitors the memory location on behalf of both processor core 108 and processor core 112.

For this example, it is assumed that the same memory location is to be monitored on behalf of both processor core 108 and processor core 112. However, in some embodiments, processor core 108 and processor core 112 may each have a different memory location monitored (simultaneously) by processor core 110. In these embodiments, forward GETS 512, probe response 514, and other messages may not be sent between processor core 110 and processor core 112 (as these are sent to preserve the monitoring of the single memory location). Instead, when processor core 108 and processor core 112 wish to have two different memory locations monitored, the operations performed by processor cores 108-112 may separately appear more like the operations shown in FIG. 3 for each of processor core 108 and processor core 112. For clarity, it is also assumed for this example that both processor core 108 and processor core 112 have the memory location monitored for the same condition. However, in some embodiments, processor core 108 may have the memory location monitored for a different condition than processor core 112.

The process shown in FIG. 5 starts when processor core 108 prepares to enter a lower-power mode. As part of the preparation, processor core 108 sends GETS 500 to load a memory location that is to be monitored to a cache block in L1 cache 116 in a shared coherency state. Upon receiving GETS 500, directory 132 performs operations (e.g., invalidations, coherency updates, etc.) to get shared permission for the memory location and then sends data 502 from the memory location to processor core 108 to be stored in L1 cache 116 in the shared coherency state. After storing the data to the cache block in L1 cache 116, processor core 108 enters the lower-power mode.

Next, processor core 110 sends GETX 504 to directory 132 to load the memory location to a cache block in L1 cache 118 in an exclusive coherency state. Because processor core 108 holds the copy of the memory location in the shared state, directory 132 forwards GETX 504 to processor core 108 as forward GETX 506 (which indicates the memory location and that GETX 504 came from processor core 110). Upon receiving forward GETX 506, processor core 108 sends probe response 508 to processor core 110 (and may also send an acknowledge signal to directory 132). Probe response 508 includes the data requested by processor core 110, along with an indication of the condition that is to be met by the memory location. For example, in some embodiments, probe response 508 may include a test value (e.g., 64) and a conditional test to be performed to determine if a value in the memory location has a corresponding relationship to the test value (e.g., greater than, equal to, not equal to, less than, etc.). As another example, in some embodiments, probe response 508 may include a test to determine if the value in the memory location changed in a given way with regard to at least one prior value in the memory location.

Upon receiving probe response 508, processor core 110 stores the data to a cache block in L1 cache 118 for the memory location in the exclusive coherency state. Processor core 110 also stores an identifier of the memory location (and/or the cache block) and the condition to be met by the memory location to enable subsequent determination of whether the memory location meets the condition. For example, processor core 110 can store the identifier of the memory location and the condition to be met by the memory location in the appropriate fields in an entry associated with processor 108 in condition table 204 in processor core 108.

Processor core 110 may (or may not) then modify the value of the cache block. In the event that processor core 110 modifies the value of the cache block, based on the modification of the value in the cache block, processor core 110 reads the stored identifier for the memory location and determines that the cache block is to be monitored to determine if the associated memory location meets the condition. Processor core 110 then uses the stored condition to determine whether the memory location meets the condition. For example, when the test value is 13 and the condition is "greater than or equal," processor core 110 can perform one or more operations to determine if the value in the memory location is greater than or equal to 13. For this example, it is assumed that the value in the memory location does not meet the condition and hence processor core 110 performs subsequent operations without sending wakeup 522 to processor core 108.

Next, processor core 112 prepares to enter a lower-power mode. As part of the preparation, processor core 112 sends GETS 510 to load the memory location (which processor core 112 also wants monitored) to a cache block in L1 cache 120 in the shared coherency state. Upon receiving GETS 510, because processor core 110 holds the copy of the memory location in the exclusive state, directory 132 forwards GETS 510 to processor core 110 as forward GETS 512 (which indicates the memory location and that GETS 510 came from processor core 112). Upon receiving forward GETS 512, processor core 110 sends probe response 514 to processor core 108 (and may also send an acknowledge signal to directory 132). Probe response 514 includes the data requested by processor core 112, along with an indication of the condition that is to be met by the memory location and that processor core 108 is to be notified if the memory location meets the condition. In this way, processor core 110 forwards the condition from probe response 508 to processor core 112.

Upon receiving probe response 514, processor core 112 stores the data to a cache block in L1 cache 120 for the memory location in the shared coherency state. Processor core 112 also stores an identifier of the memory location (and/or the cache block) and the condition to be met by the memory location to enable subsequent determination of whether the memory location meets the condition. For example, processor core 112 can store the identifier of the memory location and the condition to be met by the memory location in the appropriate fields in an entry associated with processor core 108 in condition table 204 in processor core 112. Processor core 112 then enters the lower-power mode.

In this example, as part of sending probe response 514 to processor core 110, processor core 110 invalidates the cache block in L1 cache 118 for the memory location. Thus, processor core 110 can no longer monitor the memory location. As described, however, processor core 110 forwards the condition to processor core 112 in probe response 514 so that processor core 112 monitors the memory location. In this way, processor core 112 indirectly receives the condition originally sent from processor core 108.

Next, processor core 110 sends GETX 516 (which is the second GETX for the memory location sent by processor 110 in this example) to directory 132 to load the memory location to a cache block in L1 cache 118 in an exclusive coherency state. Because processor core 112 holds the copy of the memory location in the shared state, directory 132 forwards GETX 516 to processor core 112 as forward GETX 518 (which indicates the memory location and that GETX 504 came from processor core 110). Upon receiving forward GETX 518, processor core 112 sends probe response 520 to processor core 110 (and may also send an acknowledge signal to directory 132). Probe response 520 includes the data requested by processor core 110, along with an indication of the condition that is to be met by the memory location for both processor core 108 and processor core 112 (note that this probe response message differs from probe response 508 in that probe response 520 contains the condition for both processor cores 108 and 112).

Upon receiving probe response 520, processor core 110 stores the data to a cache block in L1 cache 118 for the memory location in the exclusive coherency state. Processor core 110 also stores, for each of processor core 108 and processor core 112, an identifier of the memory location (and/or the cache block) and the condition to be met by the memory location to enable subsequent determination of whether the memory location meets the condition. For example, processor core 110 can store the identifier of the memory location and the condition to be met by the memory location in the appropriate fields in an entry in condition table 204 in processor core 110 for each of processor core 108 and processor core 112.

Next, when processor core 110 modifies the value of the cache block, processor core 110 reads the stored identifier for the memory location and determines that the cache block is to be monitored to determine if the associated memory location meets the condition for each of processor cores 108 and 112. Processor core 110 then uses the stored conditions (which is the same for both processor core 108 and processor core 112 in this example) to determine whether the memory location meets the condition. If the memory location does not meet the condition, processor core 110 performs subsequent operations without sending wakeup 522 to processor core 108 and/or sending wakeup 524 to processor core 112. Otherwise, when the memory location meets the condition, processor core 110 sends wakeup 522 to processor core 108 and sends wakeup 524 to processor core 112. Receiving wakeup 522 and 524 causes processor core 108 and processor core 112, respectively, to "wake up," or transition from the lower-power mode to a higher-power mode.

As described above, in some embodiments, processor core 110 performs the check to determine if the condition is met by the memory location before sending wakeup 522 to processor core 108 and wakeup 524 to processor core 112. This differs from existing systems, in which processor core 110 simply wakes processor core 108 and processor core 112 up to check the condition each time a change is made to the cache block/memory location by processor core 110. When compared to existing systems, by performing the check in processor core 110 in this way, these embodiments can limit the amount of coherency traffic because the cache block/data is not passed between processor cores 108, 110, and/or 112 to enable the check to be performed in processor cores 108 and 112, and to enable processor core 110 to update the cache block (particularly where processor core 110 makes multiple updates to the cache block). In addition, processor cores 108 and 112 need not transition to the higher-power mode to perform the check and may therefore remain in the lower-power mode for longer periods of time.

In addition, in the above-described embodiments, the condition is passed with the data (in probe responses 514 and 520) when the cache block that contains the copy of the data from the memory location is invalidated in L1 cache 118 and then in L1 cache 120. In this way, the condition continues to be monitored in the processor core that holds the data.

In the above-described embodiments, one or more of the messages communicated between processor cores 108, 110, and 112 include information that is not included in messages in existing systems. For example, along with the data, probe responses 508, 514, and 520 include the condition to be met by the memory location (and, in the case of probe response 520, include the condition to be met by the memory location for two different processor cores 108 and 112). Including this information in the messages enables processor core 110 (and processor core 112) to check the memory location (the copy of the memory location in the exclusive state in L1 caches 118 and 120) to determine if the memory location meets the condition.

The specification/figures and claims in the instant application refer to "first," "second," "third," etc. hardware contexts. These labels enable the distinction between different hardware contexts in the specification/figures and claims, and are not intended to imply that the operations herein described extend to only two, three, etc. hardware contexts. Generally, the operations herein described extend to N hardware contexts.

Processor for Performing a Task and Scheduling Mechanism

In some embodiments, the second hardware context (i.e., the hardware context that is to receive the notification when the memory location meets the condition) is a processor core that is configured to perform a task on a batch or set of data. For example, in some embodiments, the second hardware context is a CPU or GPU processor core that is configured to perform multiple parallel tasks simultaneously (e.g., pixel processing or simultaneous instruction, multiple data operations). In these embodiments, the first hardware context (i.e., the hardware context that is to monitor the memory location) is a scheduling mechanism that is configured to monitor available data and to cause the processor core to perform the task when a sufficient batch or set of data is available to use a designated amount of the parallel processing power of the processor core.

In these embodiments, the processor core can communicate (as herein described) an identifier for a memory location where a dynamically updated count of available data is stored (e.g., a pointer to a top of a queue of available data, etc.) and a condition that is a threshold for an amount of data that is to be available before the processor core is to begin performing the task on the set of data to the scheduling mechanism. The processor core can then transition to a lower-power mode. Based on the identifier for the memory location, the scheduling mechanism can monitor the count of available data to determine when the threshold amount of data (or more) becomes available. When the threshold amount of data (or more) becomes available, the scheduling mechanism can send a signal to the processor core that causes the processor core to wake up and process the available data.

In these embodiments, the processor core can inform the scheduling mechanism of the threshold and is not responsible for monitoring the count of available data (which may conserve power, computational resources, etc.).

Processes for Communicating Between Hardware Contexts

Figure 6:
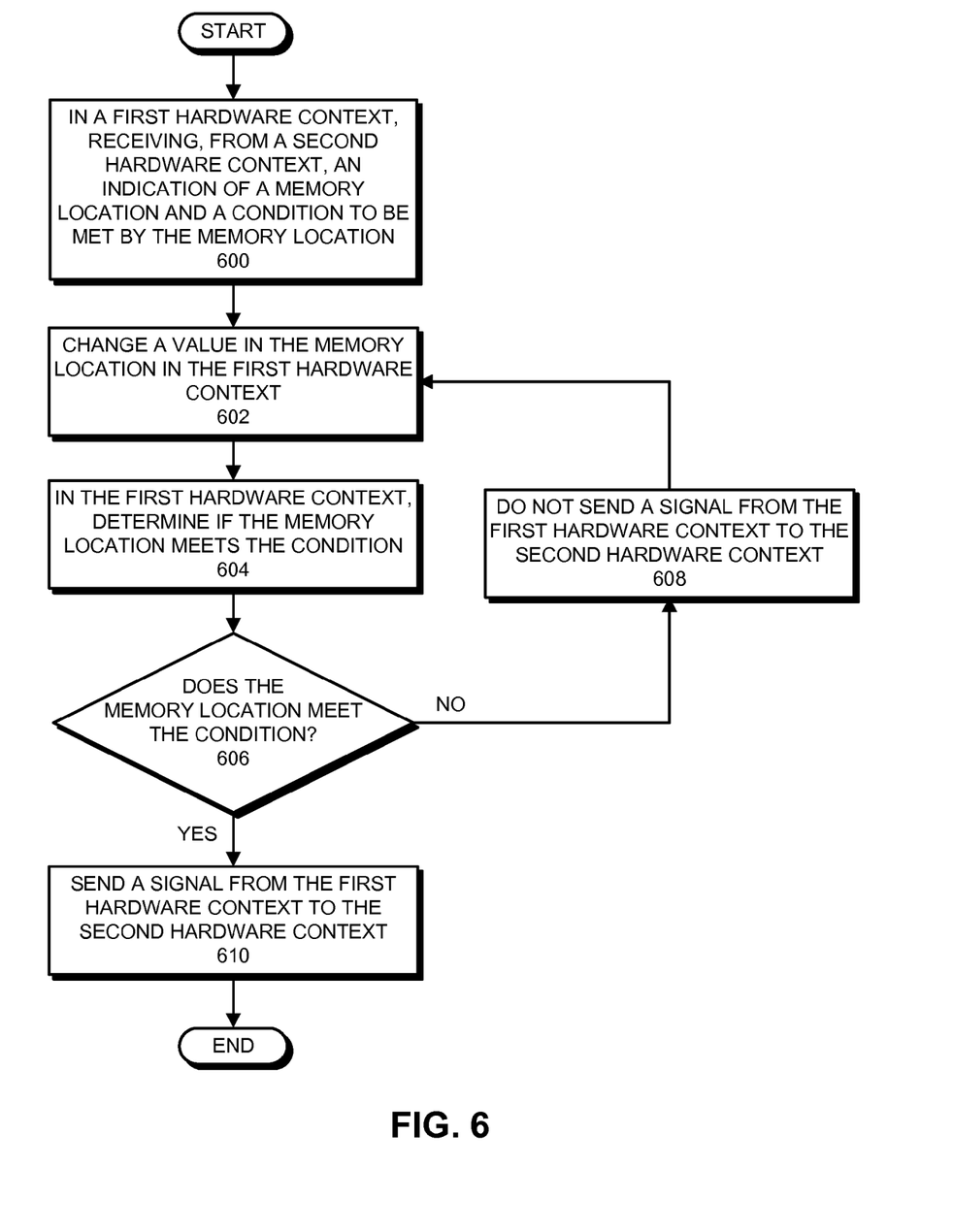
FIG. 6 presents a flowchart illustrating a process for communicating between hardware contexts in accordance with some embodiments.

FIG. 6 presents a flowchart illustrating a process for communicating between hardware contexts in accordance with some embodiments. Note that the operations shown in FIG. 6 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

In the following example, the general term "hardware contexts" is used to describe operations performed by some embodiments. As described above, a hardware context can include any portion of computing device 100 that may be configured to monitor memory locations and/or communicate as described. For example, a hardware context can include a processor core, a hardware context on a processor core, one or more functional blocks, etc.

The process shown in FIG. 6 starts when a first hardware context receives, from a second hardware context, an indication of a memory location and a condition to be met by the memory location (step 600). The first hardware context then changes a value in the memory location (step 602). For example, the first hardware context can increment the value, decrement the value, overwrite the value with a new value, perform some mathematical, combinatorial, and/or bitwise operation on the value, etc. After changing the value in the memory location, the first hardware context determines if the memory location meets the condition (step 604). For example, depending on the condition, the first hardware context can perform one or more comparison, multiplication, bitwise, combinatorial, etc. operations to compute a relationship between the value in the memory location and a designated value. If the memory location does not meet the condition (step 606), the first hardware context does not send a signal to the second hardware context (step 608) and returns to step 602. If the memory location meets the condition (step 606), the first hardware context sends a signal to the second hardware context (step 610). In some embodiments, the signal causes the second hardware context to perform some operation, such as transitioning between a first power mode and a second power mode.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a first hardware context, comprising:
   in the first hardware context, performing operations for:
      receiving, from a second hardware context, indications of a memory location and of a conditional test to be performed by the first hardware context to determine if a value in the memory location meets a condition, the condition comprising the value in the memory location having changed in a specified manner with regard to at least one prior value in the memory location, the receiving comprising:
         loading or updating a coherency state of a first copy of the memory location in the first hardware context, the loading or updating comprising forwarding an invalidation message to the second hardware context that causes the second hardware context to invalidate a second copy of the memory location held in the second hardware context and
         receiving a response message from the second hardware context in response to the invalidation message, the response message indicating that the second copy of the memory location has been invalidated, the response message comprising the indications of the memory location and of the conditional test; and
      sending a signal to the second hardware context when the memory location meets the condition.

2. The method of claim 1, further comprising:
   receiving a test value, the test value to be used in determining if the value in the memory location meets the condition.

3. The method of claim 1, wherein the method further comprises:
   in the first hardware context, performing operations for:
      changing the value in the memory location;
      after changing the value, determining whether the memory location meets the condition; and
      sending the signal to the second hardware context when the value in the memory location meets the condition.

4. The method of claim 1, wherein, upon receiving the indications of the memory location and the conditional test, the method further comprises:
   in the first hardware context, performing operations for:
      storing the indications of the memory location and the conditional test in a memory element in the first hardware context associated with the second hardware context.

5. The method of claim 1, wherein receiving, from the second hardware context, the indications of the memory location and the conditional test comprises indirectly receiving the indications of the memory location and the conditional test from the second hardware context by:
   receiving, from a third hardware context, the indications of the memory location and the conditional test, and an indication that the signal is to be sent to the second hardware context when the memory location meets the condition, the third hardware context having received the indications of the memory location and the conditional test directly or indirectly from the second hardware context.

6. The method of claim 1, wherein the signal is a power mode transition signal that causes the second hardware context to transition from a first power mode to a second power mode.

7. The method of claim 6, wherein the first power mode is a lower-power mode and the second power mode is a higher-power mode.

8. The method of claim 6, wherein the first power mode is a higher-power mode and the second power mode is a lower-power mode.

9. The method of claim 1, wherein the method further comprises:
   in the first hardware context, performing operations for:
      receiving, from a third hardware context, additional indications of the memory location and of an additional conditional test to be performed by the first hardware context to determine if a value in the memory location meets an additional condition; and sending an additional signal to the third hardware context when the memory location meets the additional condition.

10. The method of claim 1, wherein the method further comprises:

in the first hardware context, performing operations for:
after subsequently changing the value in the first copy of the memory location in the first hardware context, sending the signal to the second hardware context when the value in the first copy of the memory location meets the condition.

11. The method of claim 1, wherein the method further comprises:

in the first hardware context, performing operations for:
receiving, from a third hardware context, an invalidation message that causes the first hardware context to invalidate the first copy of the memory location; and
sending, to the third hardware context, a response message that indicates that the first copy of the memory location has been invalidated, that includes an indication of the conditional test, and that indicates that the signal is to be sent to the second hardware context when the condition is met by the memory location;
wherein the third hardware context subsequently sends the signal to the second hardware context when a value in the memory location in the third hardware context meets the condition.

12. The method of claim 1, wherein changing in the specified manner comprises:
becoming a specified fraction of the at least one prior value in the memory location.

13. The method of claim 1, wherein changing in the specified manner comprises:
becoming a specified multiple of the at least one prior value in the memory location.

14. An apparatus, comprising:
a first hardware context configured to:
receive, from a second hardware context, indications of a memory location and of a conditional test to be performed by the first hardware context to determine if a value in the memory location meets a condition, the condition comprising the value in the memory location having changed in a specified manner with regard to at least one prior value in the memory location, the receiving comprising:
loading or updating a coherency state of a first copy of the memory location in the first hardware context, the loading or updating comprising forwarding an invalidation message to the second hardware context that causes the second hardware context to invalidate a second copy of the memory location held in the second hardware context and
receiving a response message from the second hardware context in response to the invalidation message, the response message indicating that the second copy of the memory location has been invalidated, the response message comprising the indications of the memory location and of the conditional test; and
send a signal to the second hardware context when the memory location meets the condition.

15. The apparatus of claim 14, wherein the first hardware context is further configured to:

receive a test value, the test value to be used in determining if the value in the memory location meets the condition.

16. The apparatus of claim 14, wherein the first hardware context is configured to:
change the value in the memory location;
after changing the value, determine whether the memory location meets the condition; and
send the signal to the second hardware context when the value in the memory location meets the condition.

17. The apparatus of claim 14, wherein, upon receiving the indications of the memory location and the conditional test, the first hardware context is configured to:
store the indications of the memory location and the conditional test in a memory element in the first hardware context associated with the second hardware context.

18. The apparatus of claim 14, wherein, when receiving, from the second hardware context, the indications of the memory location and the conditional test, the first hardware context is configured to indirectly receive the indications of the memory location and the conditional test from the second hardware context by:
receiving, from a third hardware context, the indications of the memory location and the conditional test, and an indication that the signal is to be sent to the second hardware context when the memory location meets the condition, the third hardware context having received the indications of the memory location and the conditional test directly or indirectly from the second hardware context.

19. The apparatus of claim 14, wherein the signal is a power mode transition signal that causes the second hardware context to transition from a first power mode to a second power mode.

20. The apparatus of claim 19, wherein the first power mode is a lower-power mode and the second power mode is a higher-power mode.

21. The apparatus of claim 19, wherein the first power mode is a higher-power mode and the second power mode is a lower-power mode.

22. The apparatus of claim 14, wherein the first hardware context is configured to:
receive, from a third hardware context, additional indications of the memory location and of an additional conditional test to be performed by the first hardware context to determine if a value in the memory location meets an additional condition; and
send an additional signal to the third hardware context when the memory location meets the additional condition.

23. The apparatus of claim 14, wherein the first hardware context is configured to:
after subsequently changing a value in the first copy of the memory location in the first hardware context, send the signal to the second hardware context when the value in the first copy of the memory location meets the condition.

24. The apparatus of claim 14, wherein the first hardware context is configured to:
receive, from a third hardware context, an invalidation message that causes the first hardware context to invalidate the first copy of the memory location; and
send, to the third hardware context, a response message that indicates that the first copy of the memory location has been invalidated, that includes an indication of the conditional test, and that indicates that the signal is to be sent to the second hardware context when the condition is met by the memory location;

wherein the third hardware context subsequently sends the signal to the second hardware context when a value in the memory location in the third hardware context meets the condition.

25. A computing device, comprising:
a main memory;
a first hardware context coupled to the main memory and configured to:
   receive, from a second hardware context, indications of a memory location and of a conditional test to be performed by the first hardware context to determine if a value in the memory location meets a condition, the condition comprising the value in the memory location having changed in a specified manner with regard to at least one prior value in the memory location, the receiving comprising:
      loading or updating a coherency state of a first copy of the memory location in the first hardware context, the loading or updating comprising forwarding an invalidation message to the second hardware context that causes the second hardware context to invalidate a second copy of the memory location held in the second hardware context and
      receiving a response message from the second hardware context in response to the invalidation message, the response message indicating that the second copy of the memory location has been invalidated, the response message comprising the indications of the memory location and of the conditional test; and
   send a signal to the second hardware context when the memory location meets the condition.

* * * * *